United States Patent [19]
Herbert

[11] Patent Number: 5,245,272
[45] Date of Patent: Sep. 14, 1993

[54] ELECTRONIC CONTROL FOR SERIES CIRCUITS

[76] Inventor: David C. Herbert, 1808 N. Texas Blvd., Alice, Tex. 78332

[21] Appl. No.: 774,549

[22] Filed: Oct. 10, 1991

[51] Int. Cl.$^5$ .............................................. G05F 5/02
[52] U.S. Cl. .................................. 323/300; 323/299; 323/320; 323/349
[58] Field of Search ............... 323/299, 300, 320, 349, 323/270; 363/89

[56] References Cited

U.S. PATENT DOCUMENTS

| | | | |
|---|---|---|---|
| 4,004,214 | 1/1977 | Evans | 323/19 |
| 4,174,496 | 11/1979 | McFall et al. | 323/9 |
| 4,230,970 | 10/1980 | Potter et al. | 315/307 |
| 4,689,548 | 8/1987 | Mechlenburg | 323/243 |
| 4,804,916 | 2/1989 | Frank | 323/300 |
| 4,933,798 | 6/1990 | Widmayer et al. | 361/18 |
| 5,003,246 | 3/1991 | Nadd | 323/349 |
| 5,148,097 | 9/1992 | Draxelmayr | 323/300 |
| 5,148,098 | 9/1992 | Draxelmayr | 323/300 |

Primary Examiner—Steven L. Stephan
Assistant Examiner—Adolf Berhane

[57] ABSTRACT

An electronic controller (22) designed to be placed within an electrical series circuit for the purpose of controlling voltage and amperage applied to a series load (21) within the same circuit. The concept of design being that the controller is attached exclusively to the series circuit and obtains operating voltage through the points of connection to the series circuit. The controller provides a wide range of variable amperage control to the load being driven. Further design features are that the controller operates within a series circuits comprising alternating current, rectified alternating current, pure direct current or a combination of any without modification.

20 Claims, 2 Drawing Sheets

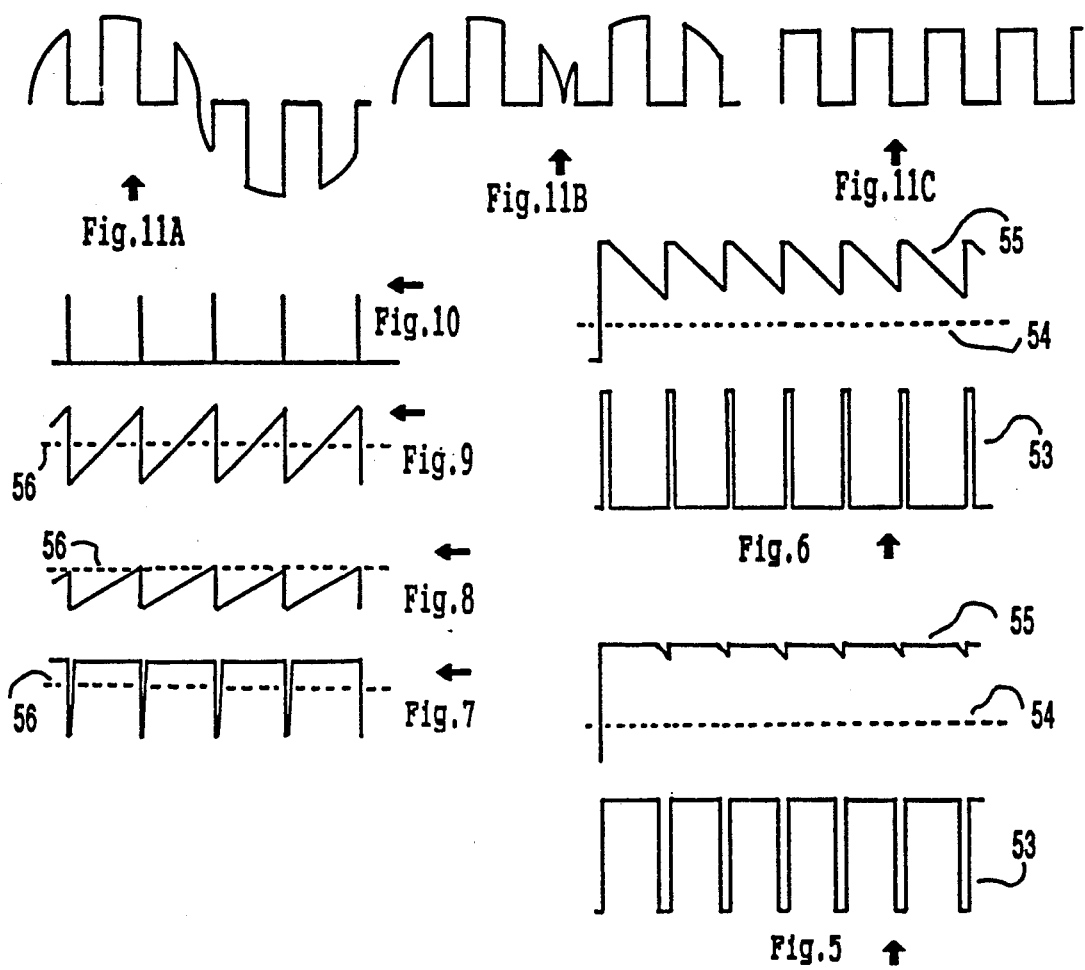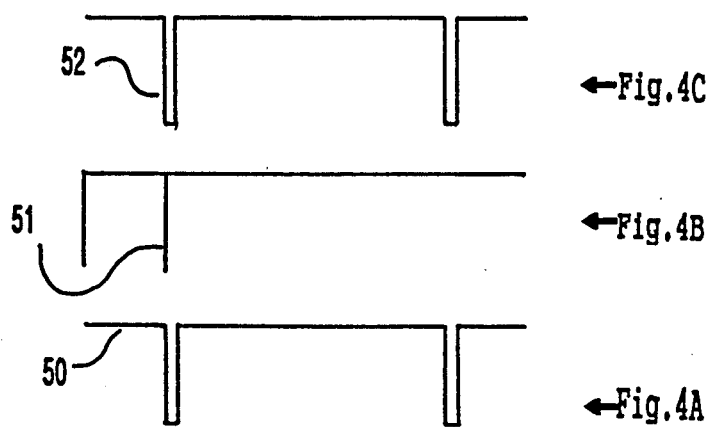

ELECTRONIC CONTROL FOR SERIES CIRCUITS

BACKGROUND—FIELD OF INVENTION

This invention relates to the control of current within a series electrical circuit, specifically circuits pertaining to the direct driving or control Of industrial apparatus utilizing electromagnetic excitation.

BACKGROUND—DESCRIPTION OF PRIOR ART

Methods have been developed to control the amperage supplied to an electrical load by various means. The reasons for controlling the amperage is for set or variable speed control of a motor or other apparatus which is electrically driven. Two basic types of circuit design are involved. One is to control the amperage within a series circuit in which the load is connected. The other is to shunt current flow away from the load by control systems which are in parallel to the load within a series-parallel configuration. The various methods of control are of three types. One is by way of amplitude control which utilizes the placement of a resistive component within the series circuit to restrict current flow. Resistance is created by use of resistors, rheostats, inductive reactive devices, and by transistors configured in an amplifying mode. Another method of control is by way of phase control utilizing thyristors (i.e. silicon controlled rectifiers and triacs) and other devices designed to fully conduct upon the application of a pulse to their grating leads. The third method is by way of pulse width modulation of the circuit current. Pulse width modulation systems are called "choppers" because they literally chop the signal on and off at a given pulse cycle frequency. While the output stage is in conduction the system acts as a switch being closed and allows full circuit current to be applied to the load. When the output stage ceases conduction the system acts as a switch which is now open and current applied to the load removed. This type of system produces an average current which depends upon the duration of the on and off pulses within a given timeframe. The on pulse is called the on pulse width. The off pulses are called the off pulse width. The duration of a single on and off pulse is called the pulse cycle. The number of pulse cycles which occur within a 1 second period determines the pulse cycle frequency.

The common method of connection to the electrical circuit for the majority of the systems mentioned is to place the output (or driving) stage in series with the load to be controlled and to connect the incoming power for the system operation in parallel to the load or by way of some alternate source of power. Resistors and rheostats are simply connected in series with the load since they do not require a source of electrical power to operate their function.

The electronic systems described above require two electrical circuits to supply power for operation. One circuit is utilized for application of power to the internal control components. The other circuit is utilized to drive the electrical load. The minimum number of electrical power connections to the control is three if configured so that the load shares one common circuit line. Most systems require a minimum of 4 connections to the electrical power. Within these systems other complications arise due to complexity of design. Problems in general are:

(a) Transformers must be used to step down line power for utilization by the control circuitry. Transformers are also necessary in the majority of applications to electrically isolate the control electronics system from the electrical system attached to the load being controlled or driven.
(b) The majority of these control systems must be electrically isolated from the actual components driving the load through the use of opto-isolators, pulse transformers and fiber optics.
(c) These systems require numerous wiring connections to the electrical systems providing power to the system and from the load driving section to the driven load.
(d) They are not easily removed and/or replaced from the equipment or housings they are placed in due to numerous wires attached to the system.
(e) They are not versatile, they operate strictly on alternating current, rectified alternating current or pure direct current, not all three.
(f) Their functions are not interchangeable. A control utilizing SCRs to drive a DC load is not designed to drive an AC load. Controls utilizing SCRs or Triacs to drive a rectified DC load are not designed to control a pure DC load and inverters driving AC loads are not designed to control DC. In all cases a specific type of control must be selected depending upon the type of current to be controlled and the type of load being driven.
(g) These systems cannot be placed in series with the load as a complete self contained unit. They must have their source of operating power connected in parallel to the load and the driven load placed in series with the output stage of the controller. In other cases operating power is obtained externally to the series circuit in which the load is located.
(h) These controls are designed to operate on set voltages and frequencies. In the United States they operate on multiples of 120, 240 and 480 volts at 60 hertz. If manufactured for Europe, they operate on 50 hertz at set voltages other than that of the United States.

The simplest method of control is the rheostat. It only requires 2 connections to the electrical circuit and these are in series with the load. The conductor to the load is simply opened and the rheostat installed between the open conductors.

A simple method of installing an electronic control in the same manner as a rheostat (only 2 connections to the electrical circuit in series with the load) greatly simplifies installation and consequent costs of manufacture. The ability to control the range of various types of currents such as a rheostat can (alternating current AC, rectified AC to direct current DC, pure DC, and an AC imposed on a DC level) even further increases the adaptability and reduces the cost of installation and manufacture.

The major obstacles in design of an electronic circuit which is placed in series with the electrical load as a complete unit were (1) how would it obtain power for operation, (2) how could the unit produce a control range from minimum to maximum power to the load without depleting its own source of power, (3) how could it switch the actual generated current fully to the load and preclude the use of stored charges for this purpose, and (4) how could the circuit be designed to preclude any resistance within the current path of the electrical load.

With the introduction of CMOS devices, which consume extremely low current, and power MOSFETs, which utilize voltage rather than current to drive their gates, it became possible to design a system, requiring a very small amount of current for operation, and which could be placed in a series circuit with the same attachments as a rheostat, producing an extremely large range of control.

The system I have designed is installed as a complete control unit to the series circuit of which it controls without attachments to any other source of power required. Only 2 electrical connections are needed for attachment of the unit to the circuitry.

OBJECTS AND ADVANTAGES (a) The complete control unit is placed in series with the load, only two connections to the electrical system are required. The operating power for the unit is obtained from the series circuit in which the load is located.

(b) The control unit will operate on and control the three basic types of generated current without modification. AC, rectified AC to DC, and pure DC.

c) The control is easily installed or removed from any new or existing system. To install, simply cut the wires to the load and place the unit between the cut wires.

(d) Due to the pulse width modulation feature of the system, it may be placed in parallel to existing control rheostats (as a remote or secondary control) without the necessity of changing the resistance of the existing rheostat to compensate for the sum of parallel resistance.

(e) The system may be used as an emergency or temporary control easily without extensive wiring changes in the event that the machine's original control fails and cannot quickly be repaired or replaced.

(f) The system is not set for specific voltages. It is designed to operate over a wide range of voltages.

(g) The system is not designed to operate at specific frequencies. It operates over a wide band of frequencies.

(h) The control unit does not require any type of isolation from the circuit it drives. It is an integral part of the series circuit.

(i) The control unit does not require fusing. Since the control unit is placed exclusively in series with the driven load, the load becomes the current limiting factor within the circuit. A catastrophic failure of the control unit would only cause the load to be driven at maximum.

(j) The cost of manufacture is very low. The unit described consists of only 19 electronic components and 4 physical components.

DRAWING FIGURES

Figure 2:
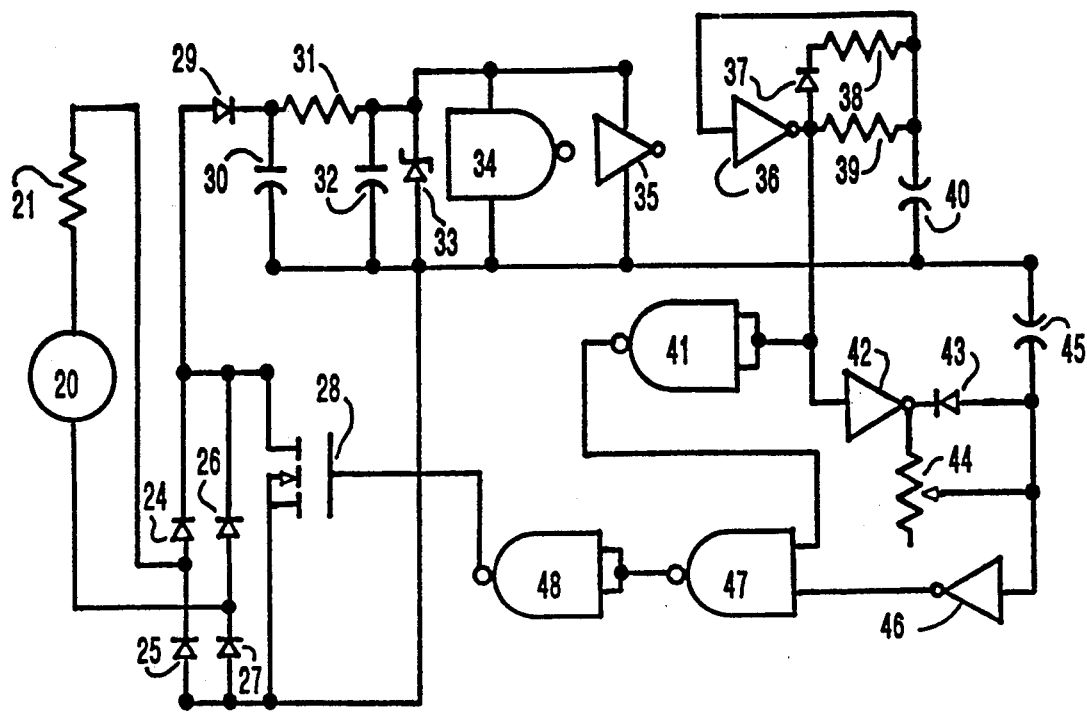
FIG. 2 is the electronic schematic of the controller.

FIGS. 4A, 4B, and 4C are waveforms generated within the controller to prevent turn-on to saturation.

FIGS. 5 and 6 show how the charge within the circuit is refreshed and maintained throughout the conduction cycle.

FIGS. 7, 8, 9, and 10 are waveforms generated within the timing and pulse circuit.

FIGS. 11A, 11B and 11C are the waveforms of chopped alternating current, rectified alternating current to direct current, and a pure direct current respectively.

REFERENCE NUMERALS IN DRAWINGS

| ITEM | NOMENCLATURE | VALUE | PART NUMBER |
|---|---|---|---|
| 24 | diode | 6 amp | 6A4 |
| 25 | diode | 6 amp | 6A4 |
| 26 | diode | 6 amp | 6A4 |
| 27 | diode | 6 amp | 6A4 |
| 28 | HEXFET | 16 amp | IRF530 |
| 29 | diode | 6 amp | 6A4 |
| 30 | capacitor | 100 UF | |
| 31 | resistor | 6.8K 2W | |
| 32 | capacitor | 100 UF | |
| 33 | zener diode | 12 V | |
| 34 | quad Schmitt NAND | | CD4093BCN |
| 35 | hex Schmitt inverter | | HCF40106BE |
| 36 | hex Schmitt inverter | | HCF40406BE |
| 37 | diode | 1 amp | 1N4004 |
| 38 | resistor | 1K | |
| 39 | resistor | 100K | |
| 40 | capacitor | .1 UF | |
| 41 | quad Schmitt NAND | | CD4093BCN |
| 42 | hex Schmitt inverter | | HCF40106BE |
| 43 | diode | 1 amp | 1N4004 |
| 44 | rheostat | 100K | |
| 45 | capacitor | .1 UF | |
| 46 | hex Schmitt inverter | | HCF40106BE |
| 47 | quad Schmitt NAND | | CD4093BCN |
| 48 | quad Schmitt NAND | | CD4093BCN |

GENERAL OPERATIONAL DESCRIPTION

The invention described is of an electronic controller which is installed within an electrical series circuit and controls the amperage to the load connected within the same series circuit, the operational voltage and current supply for the controller being the resultant open circuit potential of the driven load during non-conduction cycles produced by the controller. The control is designed to be placed in series with the load it drives without the requirement for connections to any other source of power. The basic principle being that of an electronic rheostat, utilizing pulse width modulated control verses resistive amplitude control. The design of the controller is such that any alternating or direct current can be controlled without modification or adjustments to the system. Operation of the circuit provides a current adjustment range to the load from 0.05% to 98% of available current within the series circuit. The controller described herein is designed to operate at a voltage level (AC or DC) from 10 to 100 volts. The chopping frequency is 232 pulses per second. The controller is not synchronized to the signal being modulated. It is designed so that its chopping frequency is modulated with the series circuit current and sweeps throughout the controlled series circuit signal, chopping in a random manner to produce an average voltage or current level based on the sum of the pulses generated. Higher voltage and current levels of operation than that demonstrated are available with component substitutions within the circuit.

DETAILED DESCRIPTION OF OPERATION

For the purposes of discussion (refer to FIGS. 1A, 1B and 1C) the load will be shown as a resistance 21 and the source of the various types of power shown as 20. The load driven may be inductive, resistive, capacitive or a combination of any or all. In all cases, the controller 22 is installed in series with the load 21 and source of power 20.

Figure 1A:
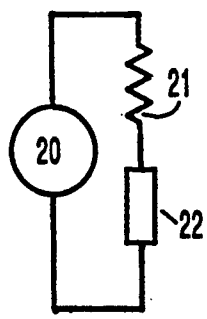
FIG. 1A shows connections for control of alternating current.
Figure 1B:
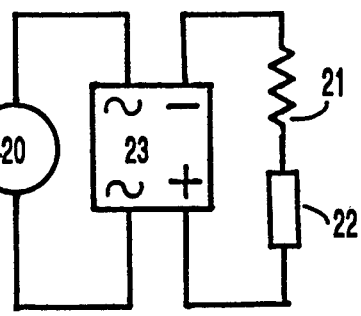
FIG. 1B shows connections for control of alternating current rectified to direct current.
Figure 1C:
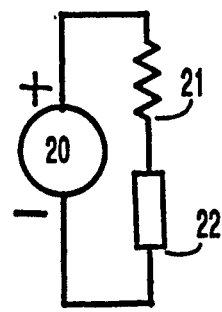
FIG. 1C shows connections for control of direct current.

In reference to FIGS. 1A, 1B and 1C various sources of power and their connections to the controller 22. FIG. 1A shows the series connection for alternating current. The source of current 20 is connected to the controller 22, through the controller and to the load 21, which is then connected back to the power source. FIG. 1B shows a connection for rectified alternating current. The current source 20 is attached to a full wave rectifier bridge 23 which rectifies the alternating current to a direct current. The output of the bridge is then connected to the load 21 and controller in the same manner as described in FIG. 1A. FIG. 1C shows connections to a pure direct current source 20 such as generated by a DC generator or battery. The connections are the same as in FIG. 1A. In FIGS. 1B and 1C polarity signs are denoted but are shown only to show a direct current flow. The system operates regardless as to polarities.

Now referring to FIG. 2. This drawing describes the detailed operation of the controller. The figure denotes the external components to the circuit 21 and 20 along with the internal components to the circuit 24 through 48. The controller's system consists of three functional sections. A power control section 24 through 28, a circuit power supply section 29 through 33 and a pulse generation system 34 through 48. The controller is connected in series between the power source 20 and the load 21. The current generated by the power source 20 flows within a closed loop through the load 21 and controller 22 back to the power source. Connections of the series circuit to the controller are at the anode of diode 24 and the anode of diode 26. Within the controller the series path is split into a parallel circuit. The primary current path is through the full wave rectifier bridge consisting of diodes 24,26,25,27 and a HEXFET 28. The purpose of the rectifier bridge assembly is to rectify any incoming series circuit signal, regardless of polarity, to the correct polarity for utilization within the controller's circuit and at the same time not affect the waveshape or polarity of the series signal external to the control and which flows throughout the series circuit. A secondary path, consisting of a fraction of the total circuit current, is from the anodes of diodes 25 and 27, through components 29 through 48 and back to the cathodes of diodes 24 and 26. The components within this secondary path are of CMOS construction and require a very small amount of current. The gate of the HEXFET 28 operates at voltage potentials rather than current.

The basic operation of the system is that the current within the whole series circuit is chopped (pulse width modulated) at a set frequency. When the HEXFET 28 is in conduction, 100% of the available current within the series circuit is applied to the load 21. The system is designed so that when the HEXFET 28 conducts, it creates a short across the positive and negative outputs of the rectifier bridge (diodes 24, 25, 26 and 27) causing full current flow within the series circuit. While the HEXFET 28 is conducting, the secondary parallel path of current flow (as described above) is short circuited but the pulse circuitry continues to operate due to the actions of diode 29 and capacitor 30.

When the HEXFET 28 is not conducting, it creates an open current path to the main current flow within the series circuit. Current does flow through the secondary circuit but it is in the micro-amp range and is not enough to power the load 21. The periods that the HEXFET is on and off create a chopped signal and these periods of either on or off conditions are determined by the pulse generation system. The width of the on pulse determines the magnitude of the average current within the series circuit. The pulse width is variable to provide from 0.05% to 98% of maximum average series circuit current.

When the HEXFET 28 is not conducting, creating an open circuit to the main series current path, almost all of the full voltage potential of the current source 20 is felt at the junction of the anodes of diodes 24 and 26 due to the very low resistance of the load 21 in comparison to the extremely high resistance of the secondary circuit. At this time diode 29 is forward biased and charges capacitor 30 up to near the source potential. The charge is extremely rapid due to the short RC time constant of the capacitor and the low resistance of the load 21. A zener diode 33 clamps the high voltage felt on capacitor 30 to twelve volts which is used to power the pulse circuitry. A resistor 31 limits the current through the zener diode to a safe level. A capacitor 32 is provided for filtering. The twelve volts is supplied to the Schmitt NAND gate 34 and Schmitt inverting trigger 35 (shown only for interconnection purposes).

When the HEXFET 28 conducts and shorts out the secondary path of current, capacitor 30 does not discharge due to the blocking action of diode 29. The capacitor 30 starts to slowly discharge while supplying power to the secondary circuit but the designed time interval between on and off pulses prevents the capacitor from discharging below twelve volts. FIGS. 5 and 6 show the level of charge on the capacitor 30 during the conduction of the HEXFET 28. In both figures item 53 is the voltage at the drain of the HEXFET. Item 54 is the working voltage of the pulse circuit (twelve volts). Item 55 is the voltage across capacitor 30. Referring to FIG. 5. When the HEXFET is producing a minimum pulse width the voltage maintained at the HEXFET drain 53 is positive for a long portion of the pulse cycle. The capacitor 30 is charged and held to its maximum level until the HEXFET conducts. At that time the drain voltage of the HEXFET drops to zero volts (as shown by the low pulses) and the capacitor starts to discharge but is immediately recharged (refreshed) when the HEXFET ceases conduction. The twelve volt level 54 is not approached due to the small amount of discharge on the capacitor along with the short conduction time of the HEXFET. Refer to figure 6. This figure shows a maximum conduction cycle of the HEXFET 28. The principle is the same as that described in figure 5 except that the drain voltage 53 is positive for an extremely short duration within the pulse cycle. During the long conduction cycle of the HEXFET the capacitor discharges to a much lower level 55 but still does not reach the twelve volt level 54 before the HEXFET ceases conduction and recharges the capacitor. The system design is such so that the HEXFET is prevented from conducting during the complete pulse width cycle and consequently discharging the capacitor below the twelve volt level. Further explanation in contained herein.

Now referring back to FIG. 2. Now that the pulse circuit power supply has been explained, detailed operation of the pulse control circuits are discussed. For clarification, the terms high and low are used. The term high denotes a voltage level of twelve volts. The term low denotes a voltage level near zero volts. Within the following discussion 7 volts will be the turn on threshold voltage for all mentioned schmitt gates within a twelve volt circuit. Turn off voltage of the schmitt gates will be an off threshold level of 4.6 volts. Due to the design of the Schmitt devices a dead-band of 2.4 volts exists between turn on and turn off. Due to the on and off threshold levels of the gates, the capacitor 40 charges and discharges between the threshold levels within the dead-band producing a very stable train of pulses for system timing as shown in FIG. 10.

Upon the initial application of power, the input of the inverting gate 36 is low due to capacitor 40 being in a discharged state. The output of the gate 36 immediately goes high and begins to charge the capacitor 40 through a parallel network consisting of diode 37, resistor 38 and resistor 39. The value of resistor 38 is low while the resistance of resistor 39 is high. The parallel resistance of this circuit is small when the output of the gate 36 is high. The capacitor charges very rapidly in a high direction until the voltage on the input of the gate 36 reaches the on threshold level. At this time the output of the gate 36 goes low but now a very high resistance is felt in the discharge path of the capacitor 40 due to the blocking action of diode 37 which prevents discharge through resistor 38 and routes the discharge current through resistor 39 which is a very high resistance. The capacitor 40 discharges to the off threshold level of the gate 36 and switches the output of the gate 36 to go high once again. This action is continually repeated as the capacitor 40 charges and discharges producing a train of pulses on the output of gate 36 with short high pulses for system timing. Resistor 39 determines the low pulse duration and resistor 38 determines the high pulse duration. The combination of both resistors 38 and 39 determine the pulse cycle frequency and duration for the system. The output of gate 36 is connected to the inverting gate 42 and NAND gate 41. NAND gates 41 and 48 are configured as inverting gates but not shown as single Schmitt inverting gates on the schematic so as to reflect actual circuit board layout and construction. The signal at the input of gate 42 is a short duration high repeating pulse (FIG. 10). When the input to gate 42 is high the output is low, immediately discharging capacitor 45 through diode 43. When the input to gate 42 is low the output is high, charging capacitor 45 through a rheostat 44. The rate of charge is determined by the resistance setting of the rheostat 44. The resultant waveform generated by capacitor 45 is connected to the input of gate 46. The resultant waveforms are shown in FIGS. 7, 8 and 9. The dotted line 56 within these figures denote the on threshold level of gate 46. During the following discussion the mentioned capacitor is capacitor 45 and the mentioned rheostat is rheostat 44. In reference to FIG. 9. As the rheostat is moved to the position of mid range resistance the resulting waveform is a sawtooth wave which reaches the threshold voltage 56 approximately halfway through the pulse cycle which will ultimately drive the on and off cycles of the controller at a rate of 50%. Now referring to FIG. 7. When the rheostat is set to its lowest resistance (0 ohms) the charge and discharge of the capacitor is almost immediate. The threshold on voltage 56 is reached within 0.05% from the beginning of the pulse cycle which will ultimately drive the on cycle of the controller at 0.05% and the off cycle of the controller at 99.05%. Now referring to FIG. 8. This drawing denotes the main problem to overcome in the design of the subject invention. When the rheostat is set at the position of maximum resistance the charge on the capacitor may be too slow to reach the threshold voltage 56 during the pulse cycle ultimately causing the controller to have an on conduction cycle of over 99%. A conduction cycle of this duration would cause the capacitor described in FIG. 2. Item 30 to eventually discharge below the twelve volt level and cause the electronic components to randomly operate in an uncontrolled manner as the minimal operating voltage of the gates is reached. Another problem would be that the HEXFET FIG. 2, item 28 would not fully conduct as the voltage on it s gate fell below its full on threshold level of 4 to 6 volts causing it to heat and destruct. One method of consideration to solve the problem was by the use of a precision rheostat and capacitor (which would solve the problem) but the circuit design would have to be such as to reduce the maximum conduction cycle time below the absolute possible maximum to compensate for variances in resistance and capacitance due to ambient temperature and aging factors of the components. The solution was to introduce and invert the main system timing pulse (FIG. 10) back into the circuit to prevent a full conduction cycle and preclude the use of precision components.

Now referring back to FIG. 2. The input to gate 46 is the waveform of capacitor 45. As the sawtooth wave reaches the on threshold level, the gate 46 output switches low. As the sawtooth wave reaches the off threshold level, the gate 46 output switches high, generating a variable width square wave at a set pulse cycle frequency. The output of gate 46 is connected to one input of NAND gate 47. The system timing pulse generated by the output of gate 36 is connected to both inputs of NAND gate 41 which inverts the short high pulses to short low pulses and the long low pulses to long high pulses. The output of NAND gate 41 is connected to the other input of NAND gate 47. The arrangement of NAND gate 47 is such that when both inputs are high, the output is low. If any one of the inputs are low, the output is high. The output of NAND gate 47 is connected to both inputs of NAND gate 48 and inverted. The output of NAND gate 48 is connected to the gate of the HEXFET 28. A high signal on the HEXFET gate causes it to conduct. A low signal on the HEXFET gate causes conduction to cease. As the rheostat 44 is moved from its lowest resistance to its highest resistance, the on (or high) cycle pulse width applied to the gate of the HEXFET 28 varies proportionally. As the rheostat is moved to its maximum resistance, the high pulse width approaches the maximum limit but is prevented from reaching it due to the inverted system timing pulse from the output of NAND gate 41 which is applied to input of NAND gate 47. To further explain this limiting feature FIGS. 4A, 4B and 4C are discussed. FIG. 4C is the inverted system timing pulse 52 applied to one of the inputs of NAND gate 47 from NAND gate 41. FIG. 4B is the pulse 51 at the output of gate 46, which is connected to the other input to NAND gate 47 as the rheostat is set to maximum and the sawtooth wave just reaches the gate on threshold. A single low pulse is shown along with second pulse not occurring due to the threshold not being reached. This would be the HEXFET gate signal and consequent conduction cycle if the inverted system pulse were not introduced. FIG. 4A is the gate signal 50 of the HEXFET and also of its conduction. The conduction of the HEXFET is limited to 98% of the pulse cycle to assure positive recharge of the controllers own power supply.

Although the description above contains many specificities, these should not be construed as limiting the scope of the invention but as merely providing illustrations of some of the presently preferred embodiments of this invention. For examples: The controller may be placed in parallel with a rheostat which controls a load within a series circuit (not illustrated) and utilized as a secondary or alternate means of control, or the circuit may be modified to contain automatic current or voltage regulating features or to operate at a much higher voltage, frequency or amperage range than that shown. Other examples could be the application of the unit to operate as a set series regulator instead of a variable amperage control, a switch could be installed in the series circuit to completely turn the unit off, or its purpose changed from industrial to consumer utilization.

Thus the scope of the invention should be determined by the appended claims and their legal equivalents, rather than by the examples given.

I claim:

1. An electrical controller for the purpose of controlling current within an electrical series circuit, said series circuit comprising as a minimum, a power source, an electrical load, and said controller, of which the said controller is placed in series and in between the opening of any single conductor of said series circuit, said controller obtaining exclusive operational power from the points of connection to said conductor of said series circuit, said controller upon conduction, shunting all available current within said series circuit through said points of connection to said electrical load, said controller:
    (a) comprising circuitry to convert the current of said series circuit entering said controller to direct current of proper polarity for use within said controller and to allow said series circuit current to exit from said controller in the original waveform existing prior to conversion, and
    (b) comprising circuitry to switch said series circuit current on and off at a set frequency, and
    (c) comprising circuitry to produce regulated power to the internal components of said controller, and
    (d) comprising circuitry to control the duration of the on and off periods during the switching cycles, and
    (e) comprising circuitry to capture peak voltage levels existing between the points of connection of said controller to said series circuit conductors during periods of non-conduction, the purpose thereof being to supply power to the internal components of said controller during conduction cycles.

2. The said series circuit current of claim 1 being either alternating current, rectified alternating current to direct current, pure direct current, or a combination of any.

3. The said controller of claim 1 requiring a maximum of two connections to the said series circuit.

4. The said controller of claim 1 produces a pulse width signal which is modulated with the said series circuit current waveform.

5. The said controller of claim 1 produces a variable pulse width modulated signal repeating at a set pulse cycle frequency unsyncronized to the waveforms applied to said series circuit.

6. The said controller of claim 1 being operable over a wide range of voltages and frequencies applied to said series circuit.

7. The said controller of claim 1 being of such design as to preclude the need of electrical isolation between the source of power supplied to the control circuitry and the source of power supplied to the switching circuitry.

8. An electronic controller which provides for control of a generated current within an electrical series circuit by means of a switching circuit designed to shunt available current of said series circuit through said controller to a load connected within the said series circuit, said series circuit consisting of a minimum, a source of power, an electrical load and said controller, said controller being connected in series and in between the opening of any single conductor of said series circuit and obtaining exclusive operational power at the points of connection to said series circuit, said controller:
    (a) comprising circuitry to convert the current of said series circuit entering said controller to direct current of proper polarity for use within said controller and to allow said series circuit current to exit from said controller in the original waveform existing prior to conversion, and
    (b) comprising circuitry to switch said series circuit current on and off at a set frequency, and
    (c) comprising circuitry to produce regulated power to the internal components of said controller, and
    (d) comprising circuitry to control the duration of the on and off periods during the switching cycles, and
    (e) comprising circuitry to capture peak voltage levels existing between the points of connection of said controller to said series circuit conductors during periods of non-conduction, the purpose thereof being to supply power to the internal components of said controller during conduction cycles.

9. The said series circuit current of claim 8 being either alternating current, rectified alternating current to direct current, pure direct current, or a combination of any.

10. The said controller of claim 8 requiring a maximum of two connections to the said series circuit.

11. The said controller of claim 8 produces a pulse width signal which is modulated with the said series circuit current waveform.

12. The said controller of claim 8 produces a variable pulse width modulated signal repeating at a set pulse cycle frequency unsyncronized to the waveforms applied to said series circuit.

13. The said controller of claim 8 being operable over a wide range of voltages and frequencies applied to said series circuit.

14. The said controller of claim 8 being of such design as to preclude the need of electrical isolation between the source of power supplied to the control circuitry and the source of power supplied to the switching circuitry.

15. An electrical controller for the purpose of shunting current around electrical components placed within a series circuit which restrict or control current to a load within said series circuit, said series circuit comprising a source of power, an electrical load, a current restricting device and said electrical controller being placed in parallel with said current restricting device, said electrical controller obtaining exclusive operational power from the points of connection to the said current restricting device, said electrical controller shunting total available current of said series circuit around said current restricting device upon conduction for application to said electrical load, said controller:
- (a) comprising circuitry to convert the current of said series circuit entering said controller to direct current of proper polarity for use within said controller and to allow said series circuit current to exit from said controller in the original waveform existing prior to conversion, and
- (b) comprising circuitry to switch said series circuit current on and off at a set frequency, and
- (c) comprising circuitry to produce regulated power to the internal components of said controller, and
- (d) comprising circuitry to control the duration of the on and off periods during the switching cycles, and
- (e) comprising circuitry to capture peak voltage levels existing between the points of connection of said controller to said current restricting device during periods of non-conduction, the purpose thereof being to supply power to the internal components of said controller during conduction cycles.

16. The said series circuit current of claim 15 being either alternating current, rectified alternating current to direct current, pure direct current, or a combination of any.

17. The said controller of claim 15 requiring a maximum of two connections to the said series circuit.

18. The said controller of claim 15 produces a pulse width signal which is modulated with the said series circuit current waveform.

19. The said controller of claim 15 produces a variable pulse width modulated signal repeating at a set pulse cycle frequency unsyncronized to the waveforms applied to said series circuit.

20. The said controller of claim 15 being operable over a wide range of voltages and frequencies applied to said series circuit.

* * * * *